US007542680B2

(12) United States Patent
Waisanen

(10) Patent No.: US 7,542,680 B2
(45) Date of Patent: Jun. 2, 2009

(54) LASER CONTROL SYSTEM

(75) Inventor: Steven K. Waisanen, Big Bend, WI (US)

(73) Assignee: MHE Technologies, Inc., Wilmington, DE (US)

( * ) Notice: Subject to any disclaimer, the term of this patent is extended or adjusted under 35 U.S.C. 154(b) by 592 days.

(21) Appl. No.: 11/293,919

(22) Filed: Dec. 5, 2005

(65) Prior Publication Data
US 2006/0243881 A1 Nov. 2, 2006

Related U.S. Application Data

(60) Provisional application No. 60/675,834, filed on Apr. 28, 2005.

(51) Int. Cl.
*H04B 10/00* (2006.01)
(52) U.S. Cl. .................................................... 398/109
(58) Field of Classification Search ................ 398/106, 398/109, 111, 114
See application file for complete search history.

(56) References Cited

U.S. PATENT DOCUMENTS

| 3,735,352 | A | | 5/1973 | Pease |
| 4,294,682 | A | | 10/1981 | Deczky |
| 4,481,165 | A | | 11/1984 | Anderson et al. |
| 4,576,100 | A | | 3/1986 | Zanin |
| 4,635,802 | A | * | 1/1987 | Hylton ........................ 212/285 |
| 4,730,743 | A | * | 3/1988 | Rosman ....................... 212/312 |
| 4,836,111 | A | * | 6/1989 | Kaufmann .................... 104/89 |
| 4,987,834 | A | | 1/1991 | Peck, Jr. et al. |
| 5,079,640 | A | | 1/1992 | Gfrerer |
| 5,402,257 | A | * | 3/1995 | Hasselmann et al. ......... 398/109 |
| 7,256,705 | B2 | * | 8/2007 | Kagermeier et al. ... 340/825.72 |
| 2004/0026349 | A1 | * | 2/2004 | Colgate et al. .............. 212/284 |

\* cited by examiner

*Primary Examiner*—Quan-Zhen Wang
(74) *Attorney, Agent, or Firm*—Porter, Wright, Morris & Arthur, LLP

(57) ABSTRACT

A control system is used for remotely operating an apparatus powered by a main power source. The control system includes an auxiliary power source to provide power to the apparatus upon a loss of power to the main power source, and first and second light-emitting sources positioned remote of the apparatus. A first photoelectric sensor is positioned proximate the apparatus and interconnected with the apparatus and the auxiliary power source, wherein upon a loss of power to the main power source, the first photoelectric sensor receives light from the first light-emitting source and the first photoelectric sensor enables power to flow from the auxiliary power source to the apparatus. At least one second photoelectric sensor is positioned proximate the apparatus and interconnected with a component of the apparatus and the auxiliary power source, wherein upon a loss of power to the main power source, the second photoelectric sensor receives light from the second light-emitting source and enables power to flow from the auxiliary power source to the respective component to activate movement of the component.

28 Claims, 6 Drawing Sheets

LASER CONTROL SYSTEM

CROSS-REFERENCE TO RELATED APPLICATION

This application claims priority from U.S. Provisional Patent Application No. 60/675,834, entitled "Laser Control System for Overhead Crane", filed Apr. 28, 2005 by Steven K. Waisanen.

BACKGROUND

The present invention relates to a crane return system for returning a crane to a home position upon loss of power to the crane.

Conventional overhead cranes include a frame with a pair of bridge cross members that move along a pair of main support beams. A pair of rails are supported by the cross members and a hoist moves along the pair of rails in a direction transverse to the main support beams. Some cranes are used to store and retrieve spent fuel bundles and containers holding radioactive materials or other hazardous materials. Often, the containers are stored within cells and tunnels inside a mountain or other facility and the crane transports the containers to and from storage positions. These high or low level radiation areas cannot be entered by humans and often there is a barrier sealing the tunnel. Once the crane passes the barrier, it may become stranded due to power failure, power loss to the crane, or failure of a component within the crane. In such a state, the crane is unreachable to repair due to the hazardous nature of the tunnels. To fix the crane, the load should be moved to an area where it can be lowered and the crane must be returned to a home position where it can be repaired.

One retrieval solution uses a rope or chain, with one end attached to the crane and another end located outside the barrier, to pull the crane back to a home position or a position outside the barrier where repairs can occur. However, due to the tunnel length, use of a rope to pull the crane back is not feasible or efficient. Further, the crane may not be able to roll back to the barrier because of the power loss. Another solution uses another device that moves along the rails to retrieve the crane, however, this solution is also limited if the crane cannot roll due to power loss.

SUMMARY

In one embodiment, the invention provides a control system for remotely operating an apparatus powered by a main power source. The control system includes an auxiliary power source to provide power to the apparatus upon a loss of power to the main power source, a first light-emitting source positioned remote of the apparatus, and a second light-emitting source positioned remote of the apparatus. A first photoelectric sensor is positioned proximate the apparatus and interconnected with the apparatus and the auxiliary power source, wherein upon a loss of power to the main power source, the first photoelectric sensor receives light from the first light-emitting source and the first photoelectric sensor enables power to flow from the auxiliary power source to the apparatus. At least one second photoelectric sensor is positioned proximate the apparatus and interconnected with a component of the apparatus and the auxiliary power source, wherein upon a loss of power to the main power source, the second photoelectric sensor receives light from the second light-emitting source and enables power to flow from the auxiliary power source to the respective component to activate movement of the component.

In another embodiment, the invention provides a crane control system for remotely operating a crane powered by a main power source. The crane control system includes an auxiliary power source to provide power to the crane upon a loss of power to the main power source, a first light-emitting source positioned remote of the crane, and a second light-emitting source positioned remote of the crane. A first photoelectric sensor is positioned proximate the crane and interconnected with the crane and the auxiliary power source. Upon a loss of power to the main power source, the first photoelectric sensor receives light from the first light-emitting source and the first photoelectric sensor enables power to flow from the auxiliary power source to the crane. At least one second photoelectric sensor is positioned proximate the crane and interconnected with a component of the crane and the auxiliary power source. Upon a loss of power to the main power source, the second photoelectric sensor receives light from the second light-emitting source and enables power to flow from the auxiliary power source to the respective component to activate movement of the component.

The crane control system includes a first light-emitting source positioned remote of the crane and a first photoelectric sensor positioned proximate the crane and interconnected with a motor of the crane. Upon a loss of power to the main power source, the first photoelectric sensor receives light from the first light-emitting source and energizes the motor. The control system also includes a second light-emitting source positioned remote of the crane and at least one second photoelectric sensor positioned proximate the crane and interconnected with a component of the crane. Upon a loss of power to the main power source, the second photoelectric sensor receives light from the second light-emitting source and activates movement of the component. An auxiliary power source provides power to the motor and the component of the crane when the first and second photoelectric sensors are activated.

In yet another embodiment, a crane includes a main power source for operating the crane, an auxiliary power source for providing power to the crane upon loss of power to the main power source, a bridge adapted to travel along a pair of rails in a first direction and a second direction, and a hoist supported by the bridge and adapted for movement away from and toward a ground surface. The bridge includes a truck with a plurality of wheels for travel along the pair of rails, the truck adapted for movement away from and towards the pair of rails. An emergency control photoelectric sensor is positioned proximate the crane and interconnected with the crane and the auxiliary power source. The emergency control photoelectric sensor is adapted for receiving light from an emergency control light-emitting source positioned remote of the crane wherein upon a loss of power to the main power source, the emergency control photoelectric sensor is selectively activated by the emergency control light-emitting source to enable power flow from the auxiliary power source to the crane. A bridge photoelectric sensor is positioned proximate the crane and interconnected with the bridge wheels and the auxiliary power source. The bridge photoelectric sensor is adapted for receiving light from a light-emitting source positioned remote of the crane wherein upon a loss of power to the main power source, the bridge photoelectric sensor is selectively activated by the light-emitting source to move the bridge wheels. A bridge truck photoelectric sensor is positioned proximate the crane and interconnected with the bridge truck and the auxiliary power source. The bridge truck photoelectric sensor is adapted for receiving light from the light-emitting source wherein upon a loss of power to the main power source, the bridge truck photoelectric sensor is selectively activated by the light-emitting source to move the bridge truck. A hoist photoelectric sensor is positioned proximate the crane and interconnected with the hoist and the auxiliary power source. The hoist photoelectric sensor adapted for receiving light from the light-emitting source wherein upon a loss of power to the main power source, the hoist photoelectric sensor is selectively activated by the light-emitting source to move the hoist.

In another embodiment the invention provides a method of returning a crane to a home base upon loss of power to a main power source. The method includes charging an auxiliary power source, emitting light from a first light-emitting source positioned remote of the crane, activating an emergency control photoelectric sensor with light from the first light-emitting source wherein the emergency control photoelectric sensor is interconnected with the crane and the auxiliary power source, and energizing the auxiliary power source by activation of the emergency control photoelectric sensor. The method also includes emitting light from a second light-emitting source positioned remote of the crane, activating a photoelectric sensor with light from the second light-emitting source wherein the photoelectric sensor is interconnected with a crane component and the auxiliary power source, and activating the crane component by activation of the photoelectric sensor.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
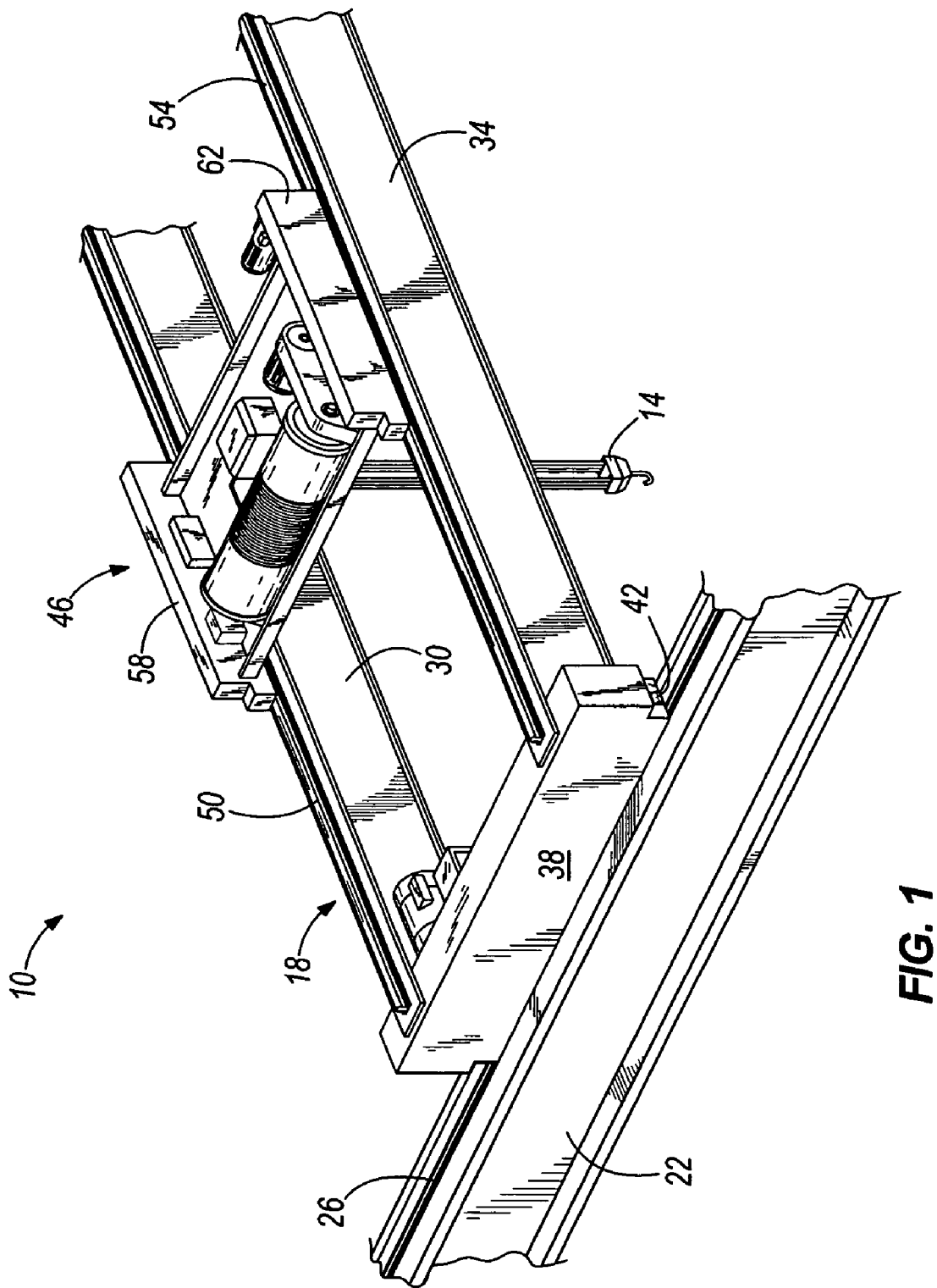
FIG. 1 is a perspective view of a crane.

FIG. 1 illustrates an overhead crane 10 that positions a hoist 14 in a crane bay for lifting and unloading a load. The overhead crane 10 includes a bridge 18 that translates along first and second main support beams 22 (only one main support beam is shown in FIG. 1). The main support beams 22 generally extend between two rails (not shown) positioned within a cave or mountain where hazardous materials are stored. As will be readily known to those of skill in the art, the main support beams 22 may alternatively extend between walls of a facility or be curved to match the inside wall contours of a round building, or include a single, curved support beam.

In the illustrated embodiment, top surfaces of the first and second main support beams 22 define rails 26 that the bridge 18 travels along. The bridge 18 includes a first girder 30, a second girder 34, and a pair of end trucks 38 that extend between the first and second girders 30, 34 (only one end truck 38 is shown in FIG. 1). The end trucks 38 or U-shaped channel members, are aligned generally parallel to the main support beams 22. Each end truck 38 defines a passage for receiving one of the main support beam rails 26. Main wheels 42 are disposed in each passage to facilitate travel of the bridge 18 along the rails 26. As will be readily known to those of skill in the art, any number of driven wheels may be disposed in the end trucks 38. Further, idle wheels may be disposed in the end trucks 38 to facilitate travel of the bridge 18 along the main support beams 22.

The first and second girders 30, 34 are spaced apart from each other and generally parallel. The girders 30, 34 are aligned transversely to the main support beams 22. A trolley 46, or second bridge, travels along girder rails 50, 54 that are positioned on top surfaces of the first and second girders 30, 34. The trolley 46 includes a pair of end trucks 58, 62 that are aligned generally parallel to the first and second girders 30, 34. Each end truck 58, 62 defines a passage for receiving one of the girder rails 50, 54. Wheels (not shown) are disposed in each passage to facilitate travel of the trolley 46 along the rails 50, 54. As will be readily known to those of skill in the art, any number of driven wheels may be disposed in the end trucks 58, 62. Further, idle wheels may be disposed in the end trucks 58, 62 to facilitate travel of the trolley 46 along the first and second girders 30, 34. As discussed below with respect to FIGS. 6 and 7, in a further embodiment the end trucks 58, 62 each include an auxiliary end truck with movable auxiliary drive wheels. As used herein, bridge is a movable carriage of the crane and includes the main bridge, the trolley carrying the hoist, or the like.

Figure 2:
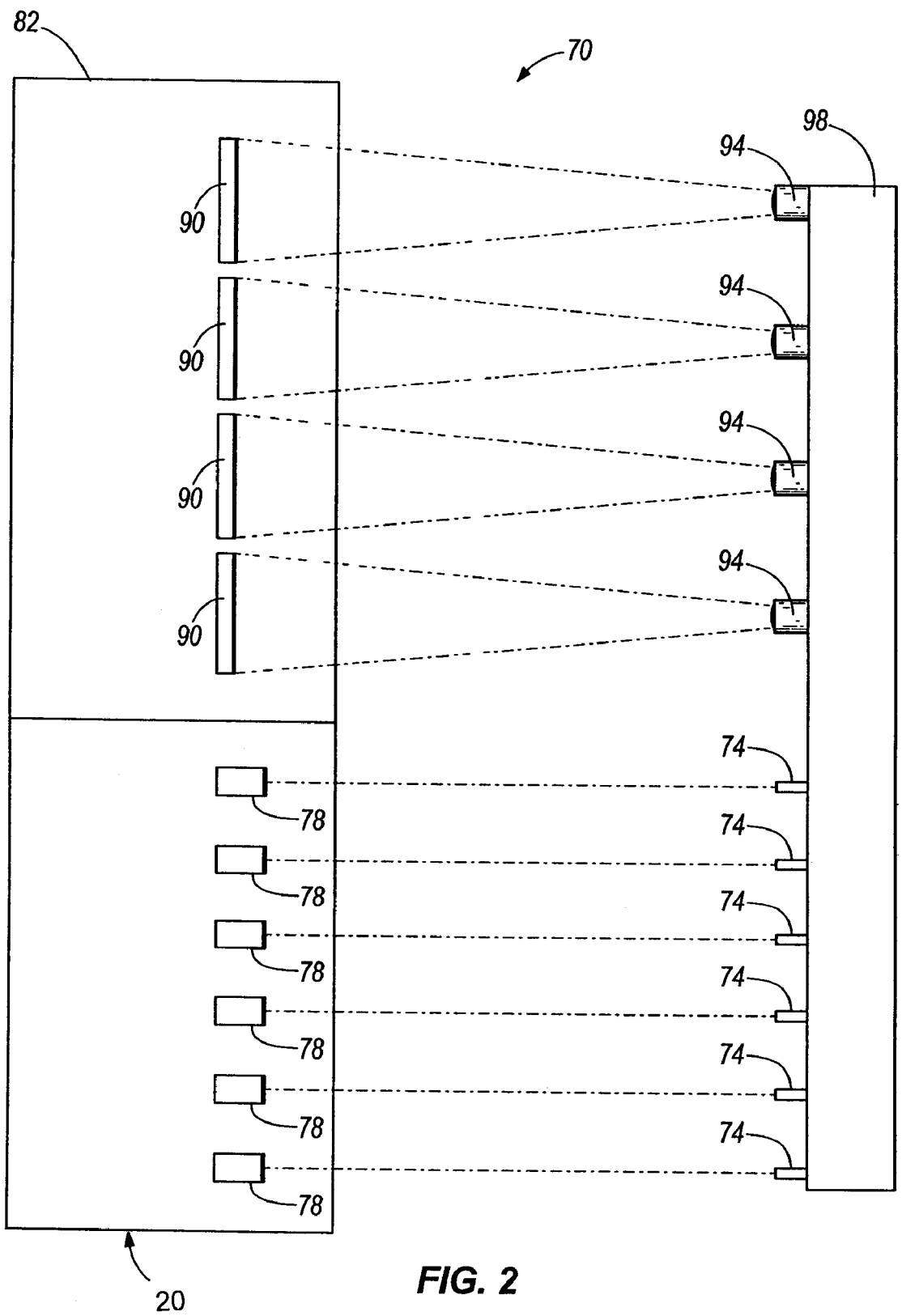
FIG. 2 is a schematic diagram of a remotely activated crane return system embodying the invention.
Figure 3:
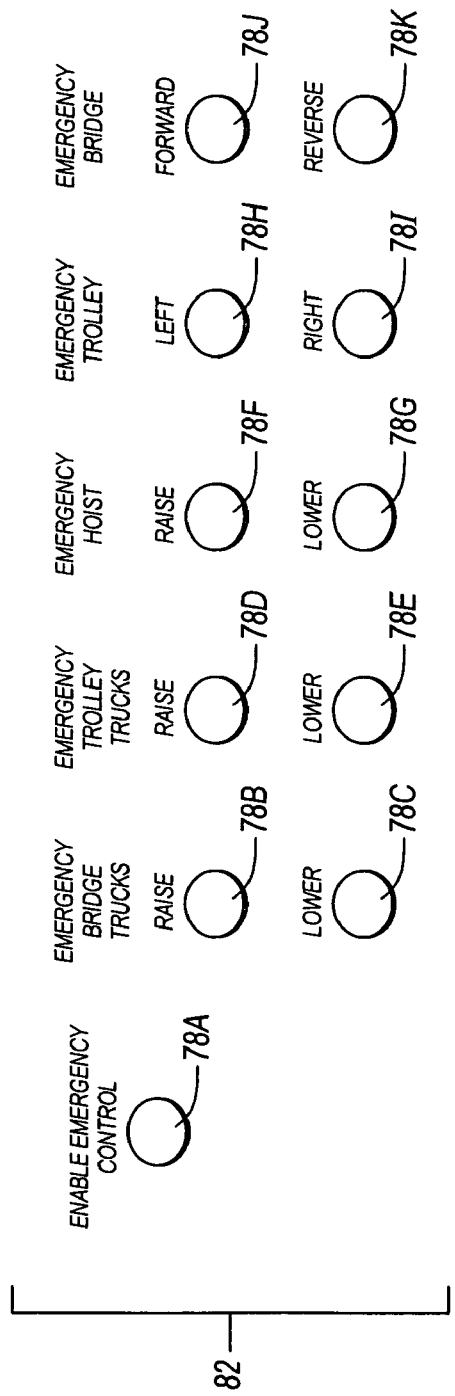
FIG. 3 illustrates a control panel for a crane return system.
Figure 4:
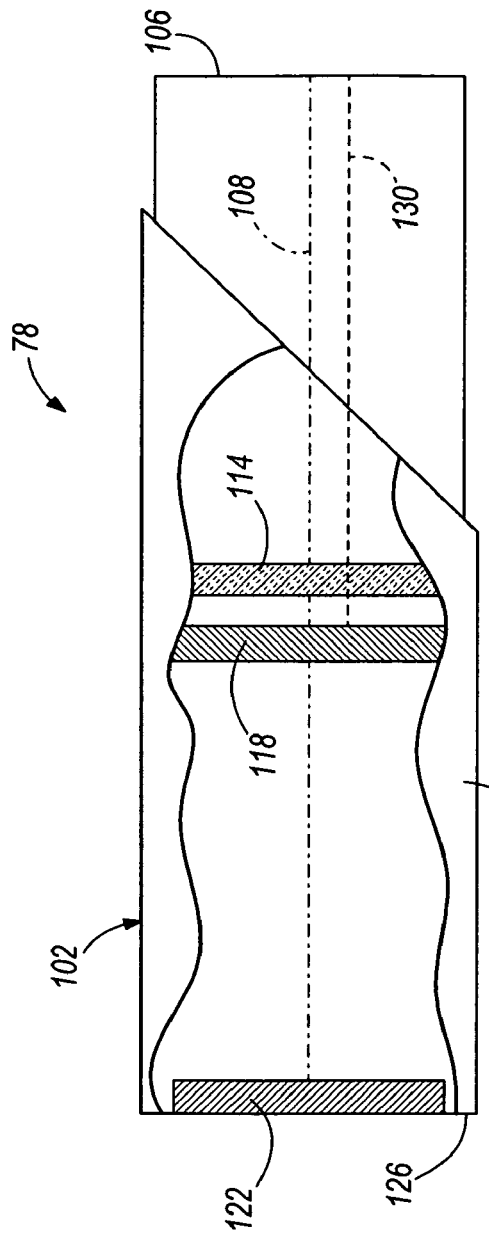
FIG. 4 is a partial section view of a photoelectric sensor of the crane return system.

FIG. 2 is a schematic diagram illustrating a crane return system 70 that is remotely activated to operate the crane 10 upon loss of power, power failure or mechanical failure of a crane component and return the crane 10 to a home position (not shown). The crane return system 70 is laser controlled in which lasers 74 are used as a signal to activate photoelectric sensors 78 positioned on a control panel 82 mounted to the crane 10 and coupled to crane components. An embodiment of the control panel 82 is shown in FIG. 3, and it should be noted a limited number of lasers 74 and photoelectric sensors 78 are shown in FIG. 2. The crane return system 70 includes an auxiliary power source 86, the lasers 74 to provide operating signals, and the photoelectric sensors 78 with light filters (FIG. 4). Examples of the crane components interconnected with the photoelectric sensors include, the hoist 14, the bridge 22, the bridge end trucks 38, the trolley 46, and the trolley end trucks 58, 62.

The auxiliary power source 86 is activated upon a loss of power to the crane 10 to provide power to the crane 10 and the crane components. As shown in FIG. 2, the auxiliary power source 86 includes four high density solar cells 90 located on the crane 10. High intensity spot lights 94 positioned remote of the crane 10, for example, on a containment wall 98 of a radiation cell, provide light to the solar cells 90 to power the solar cells 90. The solar cells 90 are powered to produce a desired voltage and current to operate the crane return system 70. In one embodiment, the solar cells 90 provide 12 VDC at 6 Amps to operate the crane return system 70. The solar cells 90 are powered during inactive periods of crane operation, prior to crane operation, or just after a loss of power. The spot lights 94 are powered by a power source separate from a main power source (not shown) for the crane 10 and the auxiliary power source 86.

In a further embodiment, fewer or more solar cells 90, or a bank of solar cells, may be used to provide power to the crane return system 70, the desired voltage and current may vary to operate the crane return system 70 depending upon the system demands, and/or a battery (e.g., a lithium polymer battery) may be used in conjunction with the solar cells 90 to store power. Further, the solar cells 90 may be located adjacent to the crane 10. It should be readily apparent to those of skill in the art that other auxiliary power sources may be used to operate the crane return system 70.

The lasers 74 of the crane return system 70 provide an operating signal to activate the photoelectric sensors 78. In the illustrated embodiment, each laser 74 is associated with one photoelectric sensor 78, however, in a further embodiment each laser 74 may be used for more than one photoelectric sensor 78. The lasers 74 are positioned remote of the crane 10, for example, on the containment wall 98 of the radiation cell, and are powered by a power source separate from the main power source (not shown) and the auxiliary power source 86. Each photoelectric sensor 78 is interconnected with a crane component. When the sensor 78 receives light from the associated laser 74, the sensor 78 activates movement of the associated crane component.

FIG. 3 illustrates the control panel 82 of the crane control system 70 including the photoelectric sensors 78. In the illustrated embodiment, the photoelectric sensors 78 are located on the control panel 82, which is positioned on or adjacent to the crane 10, however, in a further embodiment, each photoelectric sensor 78 may be positioned on the crane 10 adjacent the associated crane component. Each photoelectric sensor 78 is a switch assembly that activates a desired motion of the associated crane component when light from the associated laser 74 enters the sensor 78.

Figure 5:
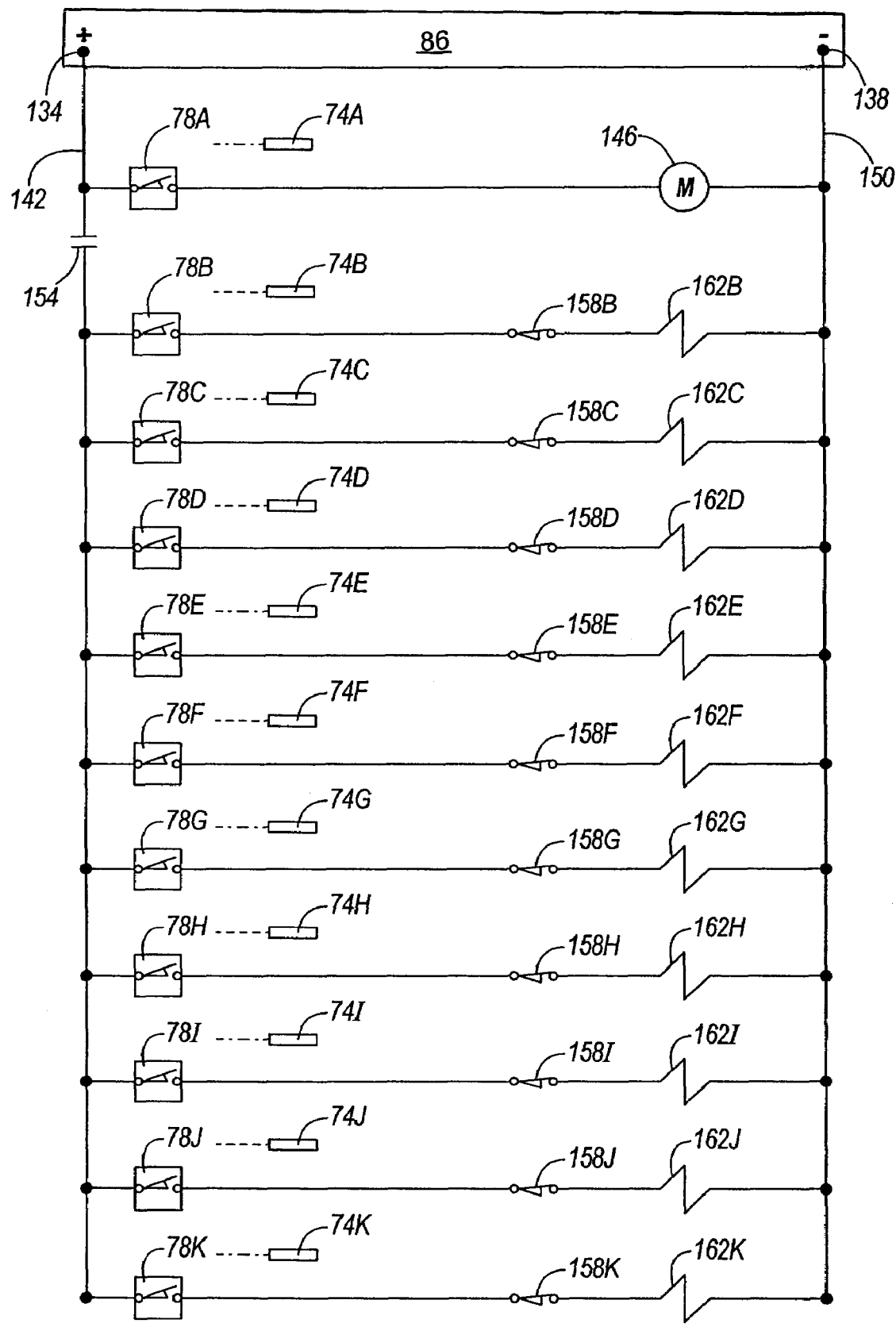
FIG. 5 is a logic diagram of the crane return system embodying the invention.

The crane return system 70 includes an enable emergency control photoelectric sensor 78A interconnected to the auxiliary power source 86 (also shown by FIG. 5). When the enable emergency control photoelectric sensor 78A receives light from the associated laser 74A (FIG. 5), the auxiliary power source 86 is enabled to provide power to the crane components and the main power source (not shown) is disabled to prevent delivery of power from the main power source to the crane components in case power is restored mid-operation. In the illustrated embodiment, in order to activate any other photoelectric sensor 78, the enable emergency control sensor 78A must be activated. Therefore, one of the lasers 74 should constantly be aimed at the enable emergency control sensor 78A during operation of the crane return system 70.

In FIG. 3, each crane component has two associated photoelectric sensors 78 whereby each sensor 78 corresponds to a different movement of the crane component. Connected to the end trucks 38 of the crane bridge 18 is an emergency raise photoelectric sensor 78B, which raises the bridge end trucks 38 when activated by the associated laser 74B (FIG. 5), and an emergency lower photoelectric sensor 78C, which lowers the bridge end trucks 38 when activated by the associated laser 74B (FIG. 5). Connected to the end trucks 58, 62 of the crane trolley 46 is an emergency raise photoelectric sensor 78D, which raises the trolley end trucks 58, 62 when activated by the associated laser 74B (FIG. 5), and an emergency lower photoelectric sensor 78E, which lowers the trolley end trucks when activated by the associated laser 74E (FIG. 5). The hoist 14 (FIG. 1) includes an emergency raise photoelectric sensor 78F connected thereto, which raises the hoist 14 when activated by the associated laser 74G (FIG. 5), and an emergency lower photoelectric sensor 78G connected thereto, which lowers the hoist 14 when activated by the associated laser 74H (FIG. 5). Connected to the bridge wheels 42 is an emergency left photoelectric sensor 78H, which when activated by the associated laser 74 rotates the bridge wheels 42 in a first direction (e.g., left or forward) to move the bridge 18, and an emergency right photoelectric sensor 78I, which when activated by the associated laser 74I (FIG. 5) rotates the bridge wheels 42 in a second direction (e.g., right or reverse) to move the bridge 18. Connected to the trolley wheels (not shown) is an emergency forward photoelectric sensor 78J, which when activated by the associated laser 74J (FIG. 5) rotates the trolley wheels in a first direction (e.g., left or forward) to move the trolley 46, and an emergency right photoelectric sensor 78K, which when activated by the associated laser 74K (FIG. 5) rotates the trolley wheels in a second direction (e.g., right or reverse) to move the trolley 46.

FIG. 4 is a partial sectional view of the photoelectric sensor 78 illustrating a switch assembly 102 to activate a desired motion of the associated crane component. The photoelectric sensor 78 includes an open end 106 where light 108 (shown by the first dashed line in FIG. 4) from a laser 74 enters the sensor 78 and an enclosure 110. The enclosure 110 houses a lens 114, a light filter 118, and a sensor portion 122 at a closed end 126. In use, light 108 from the laser 78 enters the photoelectric sensor 78 at the open end 106 and passes through the lens 114 and the filter 118 before contacting the sensor portion 122. Once the light 108 enters the sensor portion 122, the sensor portion 122 activates, for example, by a switch, the associated crane component.

The filter 118 is configured for accepting light in a specific color range, therefore, light entering the photoelectric sensor 78 must fall within a specific color range in order to pass through the filter 118 to the sensor portion 122 and activate the associated crane component. Therefore, the filter 118 of the photoelectric sensor 78 ensures that the associated crane component is activated when a laser 74 of the correct color is directed at the sensor 78. For example, in FIG. 4 light 108 is a first color and the filter 118 used in the photoelectric sensor only accepts light of the first color. Therefore, light 108 from one color laser 74 passes through the filter 118 and is received by the sensor portion 122 to activate the associated crane component. Light 130 of a second color, from another color laser, does not pass through the filter 118 to the sensor portion 122 and therefore cannot activate the associated crane component.

In one embodiment of the crane return system, the hoist 14 is interconnected to photoelectric sensors 78F, 78G, whereby the raise photoelectric sensor 78F initiates raising the hoist 14 and the lower photoelectric sensor 78G initiates lowering the hoist 14. The raise photoelectric sensor 78F includes a light filter that only accepts green light and the lower photoelectric sensor 78G includes a light filter that only accepts red light. Therefore, if the raise photoelectric sensor 78F receives red light a laser, rather than the lower photoelectric sensor 78G, the raise photoelectric sensor 78F will not activate the hoist 14 to travel in the wrong direction.

In the illustrated embodiment, two types of filters 118 are used with the photoelectric sensors 78 and two types of lasers are used. Some sensors 78 include a filter 118 that accepts red light and some sensors 78 include a filter 118 that accepts green light. The lasers 74 of the crane return system 70 include a plurality of red diode lasers (e.g., helium neon diodes) and green diode lasers (e.g., argon diodes), each laser used with a photoelectric sensor 78 including a filter for receiving the corresponding light color. It should be readily apparent to those of skill in the art that in further embodiments other laser colors and filters for such colors may be used, and that any number of laser colors and filters for such colors may be used.

FIG. 5 is a logic diagram for the crane return system 70 embodying the invention. A positive terminal 134 and a negative terminal 138 from the auxiliary power source 86 are interconnected with the photoelectric sensors 78A-78K. A positive lead 142 extends from the positive terminal 134 to each photoelectric sensor 78A-78K, the photoelectric sensors arranged in parallel.

Each of the photoelectric sensors 78A-78K includes a normally-open switch. The enable photoelectric sensor 78A is connected to a main contactor 146, which is connected to a negative lead 150 extending to the negative terminal 138 of the auxiliary power source 86. A secondary contact 154 of the main contactor 146 is positioned between the enable photoelectric sensor 78A and the remaining photoelectric sensors 78B-78K. To close the switch of the enable photoelectric sensor 78A, the associated laser 74A is shines light at the sensor 78A. Once the switch of the enable photoelectric sensor 78A is closed, the main contactor 146 is enabled and the circuit is closed between the positive and negative terminals of the auxiliary power source 86. Further, once the main contactor 146 is enabled, the secondary contact 154 is enabled to allow current to flow to the remaining photoelectric sensors 78B-78K, if activated.

As shown in FIG. 5, each photoelectric sensor 78B-78K is electrically coupled to a normally-closed limit switch 158B-158K that is positioned on the associated crane component. The limit switches include a bridge truck raise limit switch 158B that is actuated open when the bridge end trucks 38 are completely raised, a bridge truck lower limit switch 158C that is actuated open when the bridge end trucks 38 are completely lowered, a trolley truck raise limit switch 158D that is actuated open when the trolley end trucks 58, 62 are completely raised, a trolley truck lower limit switch 158E that is actuated open when the trolley end trucks 58, 62 are completely lowered, a hoist raise limit switch 158F that is actuated open when the hoist 14 is completely raised, a hoist lower limit switch 158G that is actuated open when the hoist 14 is completely lowered, a first trolley limit switch 158H that is actuated open when the trolley 46 has traveled as far as possible in the first direction, a second trolley limit switch 158I that is actuated open when the trolley 46 has traveled as far as possible in the second direction, a first bridge limit switch 158J that is actuated open when the bridge 18 has traveled as far as possible in the first direction, and a second bridge limit switch 158K that is actuated open when the bridge 18 has traveled as far as possible in the second direction.

Each limit switch 158B-158K is electrically coupled to a solenoid coil 162B-162K of hydraulic controls of the associated crane component, and each solenoid coil 162B-162K is electrically coupled to the negative lead 150 of the negative terminal 138. A bridge truck raise coil 162B controls hydraulics of the bridge end trucks 38 to raise the end trucks 38, a bridge truck lower coil 162C controls hydraulics of the bridge end trucks 38 to lower the end trucks 38, a trolley truck raise coil 162D controls hydraulics of the trolley end trucks 58, 62 to raise the end trucks 58, 62, a trolley truck lower coil 162E controls hydraulics of the trolley end trucks 58, 62 to lower the end trucks 58, 62, a hoist raise coil 162F controls hydraulics of the hoist 14 to raise the hoist 14, a hoist lower coil 162G controls hydraulics of the hoist 14 to lower the hoist 14, the first trolley coil 162H controls hydraulics of the trolley 46 to move the trolley 46 in a first direction, the second trolley coil 162I controls hydraulics of the trolley 46 to move the trolley 46 in a second direction, the first bridge coil 162J controls hydraulics of the bridge 18 to move the bridge 18 in a first direction, and the second bridge coil 162K controls hydraulics of the bridge 18 to move the bridge 18 in a second direction.

To close one of the photoelectric sensors 78B-78K, an associated laser 78B-78K shines light at the respective sensor 78B-78K. Once the switch of the enable photoelectric sensor 78A is closed, the main contactor 146 is enabled and the circuit is closed between the positive and negative terminals 134, 138 of the auxiliary power source 86. The secondary contact 154 is enabled to allow current to flow to any of the remaining photoelectric sensors 78B-78K that are closed. Therefore, if the enable photoelectric switch 78A is closed, to operate one of the crane components, one of the lasers 74B-78K must shine light at the respective sensor 78B-78K to closed the normally-open switch. For example, to lower the hoist 14, the laser 74G shines light at the hoist lower photoelectric sensor 78G to close the switch. Power from the auxiliary power source 86 flows through the hoist lower photoelectric sensor 78G, the normally-closed hoist lower limit switch 158G, to the hoist lower coil 162G to control the hydraulics that lower the hoist 14. Once the hoist 14 is completely lowered, or reaches its lower limit, the hoist lower limit switch 158G is activated open to stop the flow of power to the hoist lower coil 162G, which thereby stops further movement of the hoist 14. The same sequencing is used for each of the photoelectric sensors 78B-78K and associated crane components discussed above. In one embodiment, each photoelectric sensor receives light, i.e., an operating signal, from an associated laser, however, in a further embodiment the photoelectric sensors for a specific crane component may receive light from a single laser. It should be readily apparent to one of ordinary skill in the art that the crane return system 708 may be adapted for use with any number of types of cranes or apparatus for operating an apparatus during a power loss.

Figure 6:
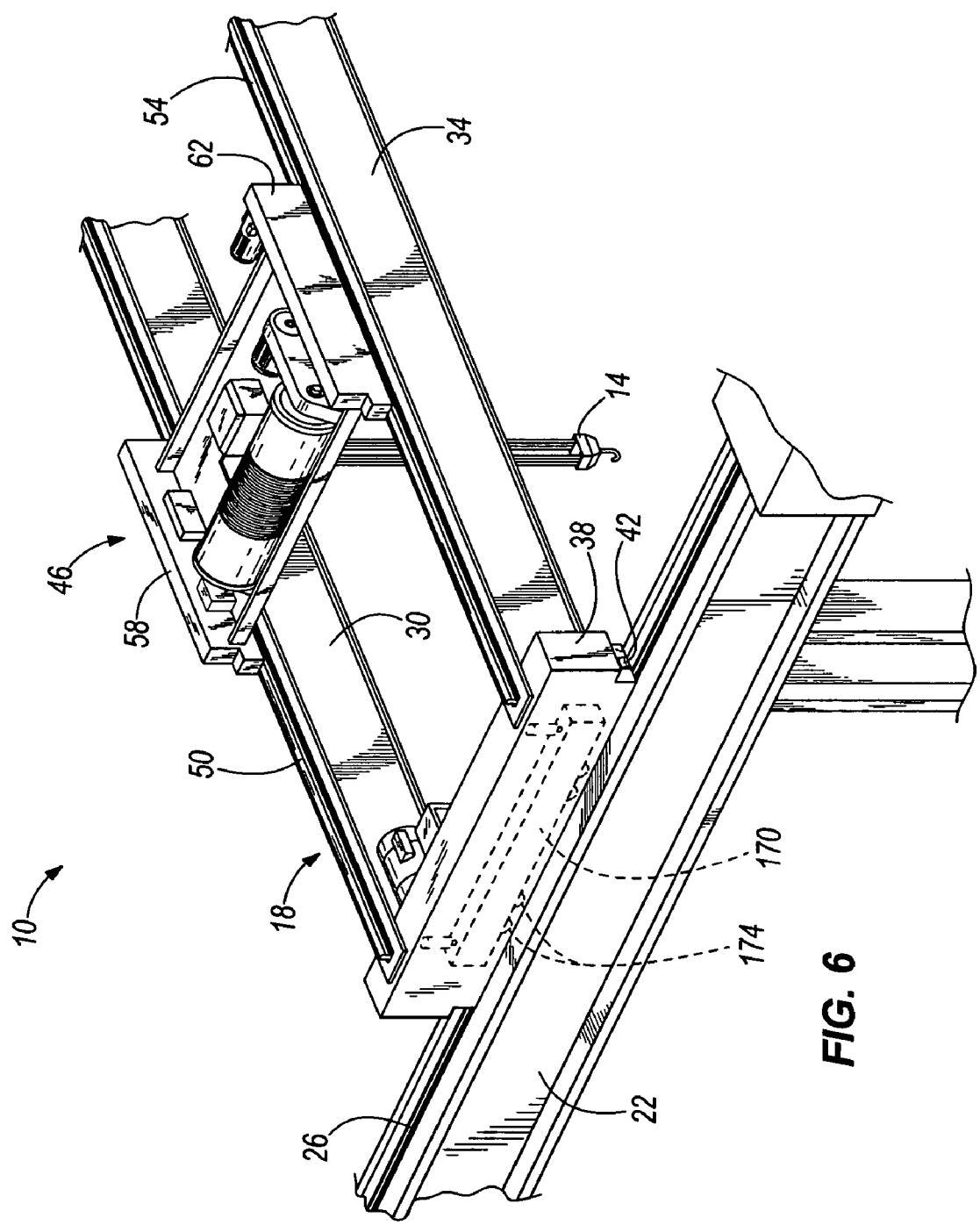
FIG. 6 is a perspective view of a crane including an auxiliary end truck.

FIG. 6 illustrates another embodiment of the overhead crane 10 including an auxiliary end truck 170 supported by the bridge end truck 38. In FIG. 6, like components of the crane shown in FIG. 1 are identified by like reference numerals. The auxiliary end truck 170 includes a plurality of auxiliary drive wheels 174. The auxiliary drive wheels 174 are movable between a first position, in which the wheels 174 are recessed from the rails 26 (as seen in FIG. 1), and a second position, in which the wheels 174 are in contact with the rails 26. Although only one end truck 38 is shown in FIG. 1, in a further embodiment, an auxiliary end truck and auxiliary drive wheels are also positioned at the second end truck of the bridge 18.

Figure 7:
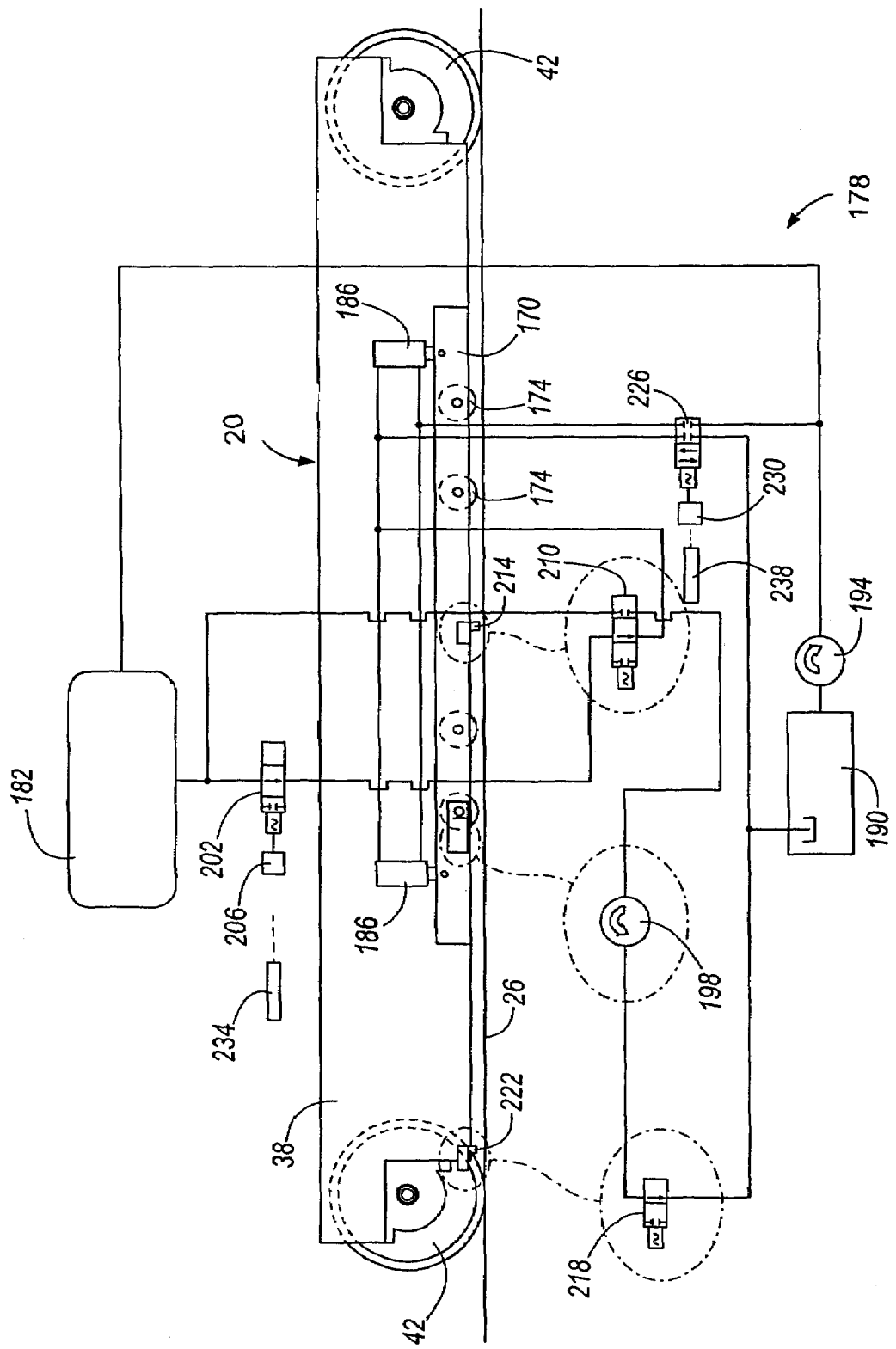
FIG. 7 is a schematic diagram of a hydraulic crane return system incorporating a remotely activated crane return system.

FIG. 7 is a schematic diagram illustrating a hydraulic crane return system 178 incorporating an embodiment of the laser controlled crane return system 70 described above for returning the crane 10 shown in FIG. 6 to a home position upon loss of power, power failure or mechanical failure of a crane component. The hydraulic crane return system is described in pending PCT Patent Application No. US05/027282 filed Aug. 1, 2005, which is hereby incorporated by reference.

The crane return system 178 includes the main end truck 38 including main wheels 42, the auxiliary end truck 170 including auxiliary drive wheels 174, a hydraulic fluid pressure vessel 182, a pair of hydraulic cylinders 186, a hydraulic reservoir 190, a pump 194, a hydraulic drive motor 198, and multiple photoelectric sensors, valves, and limit switches as discussed below. In the illustrated embodiment, the main end truck 38 forms part of the bridge 18 and supports the main wheels 42, which travel along one of the rails 26 of the main support beams 22 during normal operation of the crane 10. The auxiliary end truck 170 is supported by the main end truck 38 and includes the auxiliary drive wheels 174. The auxiliary drive wheels 174 are movable between a first position, in which the wheels 174 are recessed from the rail 26 of the main support beam 22, and a second position, in which the wheels 174 are in contact with the rail 26. In this embodiment, the hydraulic fluid serves as an auxiliary power source for operating the crane.

The hydraulic fluid pressure vessel 182 stores hydraulic fluid, wherein a substantially fixed mass of hydraulic fluid is contained within the crane return system 178. The hydraulic cylinders 186 are coupled to the auxiliary end truck 170 and fluidly communicate with the fluid pressure vessel 182. When the cylinders 186 extend, the auxiliary end truck 170 moves toward the rail 26 to thereby move the auxiliary drive wheels 174 to the second position and bring the wheels 174 in contact with the rail 26. When the cylinders 186 retract, the auxiliary end truck 170 retracts away from the rail 26 to thereby move the auxiliary drive wheels 174 to the first position and recess the wheels 174 from the rail 26. A normally-closed power loss valve 202 regulates flow of hydraulic fluid from the fluid pressure vessel 182 to the cylinders 186. The normally-closed power loss valve 202 is actuated open and closed by a power loss photoelectric sensor 206.

The hydraulic drive motor 198 is electrically connected to the auxiliary drive wheels 174 and fluidly communicates with the hydraulic fluid pressure vessel 182. When the drive motor receives hydraulic fluid from the fluid pressure vessel 182, the drive motor 198 causes rotation of the auxiliary drive wheels 178 to move the bridge 18 along the rails 26 of the main support beams 22. A wheel down valve 210 regulates flow of hydraulic fluid from the fluid pressure vessel 182 to the drive motor 198 and flow of hydraulic fluid from the fluid pressure vessel 182 to the hydraulic cylinders 186. The wheel down valve 210 is shown as a three-way valve in FIG. 7. The wheel down valve 210 is actuated by a wheel down limit switch 214 interconnected with the auxiliary end truck 170. Further, a normally-open home position valve 218 regulates flow of hydraulic fluid to and from the drive motor 198, and is actuated open and closed by a home position limit switch 222 interconnected with the bridge 18.

The hydraulic fluid reservoir 190 fluidly communicates with the hydraulic cylinders 186, the hydraulic drive motor 198, and the hydraulic fluid pressure vessel 182. The fluid reservoir 190 receives hydraulic fluid from the cylinders 186 and the drive motor 198 and stores the hydraulic fluid until the pump 194 pumps the hydraulic fluid to the fluid pressure vessel 182. A normally-closed system reset valve 226 directs flow of hydraulic fluid from the fluid reservoir 190 to either the fluid pressure vessel 182 or the cylinders 186. The system reset valve 226 is actuated open and closed by a system reset photoelectric sensor 230. In the illustrated embodiments, the power loss and system reset photoelectric sensors 206, 230 are similar to the photoelectric sensors 78 described above with respect to FIGS. 2-5.

As shown by FIG. 7, when power is supplied to the crane 10 by a main power source, i.e., during normal operation of the crane 10, the main wheels 42 are in contact with the rail 26 such that the main wheels 42 travel along the rail 26 to move the bridge 18. The auxiliary drive wheels 174 are in the first position, recessed from the rail 26, and the hydraulic cylinders 182 are retracted. While power is supplied to the crane 10, hydraulic fluid in the hydraulic fluid reservoir 190 is pumped to the hydraulic fluid pressure vessel 182. The fluid pressure vessel 182 sits as potential energy. Once the fluid pressure vessel 182 is full, a pressure relief valve (not shown) reroutes hydraulic fluid back to the fluid reservoir 190.

When power is supplied to the crane 10, the power loss valve 202 is closed to prevent hydraulic fluid from exiting the hydraulic fluid pressure vessel 182 to the hydraulic cylinders 186. The system reset valve 226 is closed to prevent hydraulic fluid being pumped from the hydraulic fluid reservoir 190 from entering the cylinders 186. The wheel down valve 210 is positioned to prevent hydraulic fluid from exiting the fluid pressure vessel 182 and entering the hydraulic drive motor 198 to energize the drive motor 198. When power is supplied to the crane 10, the home position valve is open 218, however, no hydraulic fluid passes through the valve 218 because the wheel down valve 210 is closed.

Upon loss of power to the crane 10, the crane return system 178 is utilized. A laser 234 aims light at the power loss photoelectric sensor 206 associated with the normally-closed power loss valve 202. The laser light closes the power loss photoelectric switch 206, which opens the power loss valve 202 to allow hydraulic fluid to flow from the hydraulic fluid pressure vessel 182 to the hydraulic cylinders 186. Hydraulic fluid delivered to the cylinders 186 causes the cylinders 186 to extend, thereby extending the auxiliary end truck 170 towards the rail 26 of the main support beam 22 until the auxiliary drive wheels 174 come in contact with the rail 26. Hydraulic fluid from the fluid pressure vessel 182 flows through the power loss valve 202 and through the wheel down valve 210 to the cylinders 186. The wheel down valve 210 is positioned to allow hydraulic fluid to flow from the fluid pressure vessel 182 to the cylinders 186, but not to the hydraulic drive motor 198. In the illustrated embodiment, the power loss valve 22 regulates flow of hydraulic fluid at a pre-determined flow rate to apply pressure to the cylinders 186. Subsequent to loss of power to the crane 10, the home position valve 218 and the system reset valve 226 are not actuated. The pump 194 continues to pump any hydraulic fluid remaining in the hydraulic fluid reservoir 190 to the fluid pressure vessel 182.

The wheel down limit switch 214 is positioned adjacent the auxiliary drive wheels 174 and on the auxiliary end truck 170. When the auxiliary drive wheels 174 contact the rail 26, the wheel down limit switch 214 contacts the rail 26 and actuates the wheel down valve 210 to allow hydraulic fluid to flow from the hydraulic fluid pressure vessel 182 to the hydraulic drive motor 198. Thus, the wheel down valve 210 is positioned to prevent flow from the fluid pressure vessel 182 to the hydraulic cylinders 186 and the cylinders 186 stop extending.

Force from the auxiliary drive wheels 174 contacting the rail 26 lifts the main wheels 42 from contact with the rail 26 and the main end truck 38 retracts from the rail 26. Hydraulic fluid is delivered to the hydraulic drive motor 198 from the hydraulic fluid pressure vessel 182, via the wheel down valve 210. The hydraulic fluid energizes the drive motor 198, which rotates the interconnected auxiliary drive wheels 174 to thereby move the bridge 18 along the rails 26 of the main support beams 22 and towards the home position. In the illustrated embodiment, the drive motor 198 is supported by the auxiliary end truck 170. During this phase of the crane return, the home position valve 218 and the system reset valve 226 remain in the respective initial position.

A home position limit switch 222 is coupled to the home position valve 218 and positioned proximate an end of the bridge 18. When the crane 10, and in particular the bridge 18, reaches the home position (not shown), the home position limit switch 222 is activated, for example, by contact with the home position or contact with an object at the home position. The home position limit switch 222 actuates the normally-open home position valve 218 to a closed position, which stops flow of hydraulic fluid from the hydraulic fluid pressure vessel 182 to the hydraulic drive motor 198. Once the drive motor 198 is de-energized, the auxiliary drive wheels 174 stop rotating.

During this phase of the crane return, the power loss valve 202 remains open and the wheel down valve 210 is positioned to allow hydraulic fluid to flow from the hydraulic fluid pressure vessel 182 toward the hydraulic drive motor 198, however, it should be noted the home position valve 218 prevents hydraulic fluid from flowing to the drive motor 198. The system reset valve 226 remains in its initial position to prevent hydraulic fluid from flowing from the fluid reservoir 190 to the hydraulic cylinders 186. In another embodiment, the power loss valve 202 is actuated to the closed position by stopping light from the laser 234 from activating the power loss photoelectric sensor 206, or the wheel down valve 210 is actuated to a position to prevent flow of hydraulic fluid from the pressure vessel 182 to the drive motor 198.

When power is restored to the crane 10, hydraulic fluid is used to retract the hydraulic cylinders 186 and move the auxiliary end truck 170 and auxiliary drive wheels 174 back to the first position, i.e., recessed from the rail 26 of the main support beam 22. If not done previously, the power loss valve 202 is actuated back to the closed position by stopping light from the laser 134 from activating the power loss photoelectric sensor 206. The home position valve 218 is actuated back to the open position and the wheel down valve 210 is actuated to prevent flow of hydraulic fluid from the hydraulic pressure vessel 182 to the hydraulic drive motor 198. Thus, hydraulic fluid is prevented from flowing to the cylinders 186 and to the drive motor 198. In one embodiment, the home position valve 218 and the wheel down valve 210 are actuated back to the respective initial position by using a laser and a photoelectric sensor (not shown).

A laser 238 aims light at the system reset photoelectric sensor 230 associated with the normally-closed system reset valve 226. The laser light closes the system reset photoelectric switch 230, when opens the system reset valve 226, to a second position, such that hydraulic fluid flows between the hydraulic fluid reservoir 190 and the hydraulic cylinders 186. The pump 194 pumps hydraulic fluid from the fluid reservoir 190 to the cylinders 186, which thereby retract to pull the auxiliary end truck 170 and the auxiliary drive wheels 174 away from the bridge rail 26. After the hydraulic fluid cycles through the cylinders 186, the hydraulic fluid returns to the fluid reservoir 198.

Once the auxiliary drive wheels 174 are lifted from contact with the rail 26, the force lifting the main end truck 38 and the main wheels 42 from the rail 26 is released. Thereby, the main end truck 38 returns to its initial position and the main wheels 42 are in contact with the rail 26 to travel along the rail 26 and move the bridge 18 along the main support beams 22. Once the main wheels 42 and the auxiliary drive wheels 174 return to the respective initial positions, the system reset valve 226 is actuated back to its initial closed position by stopping light from the associated laser from activating the system reset photoelectric sensor 230, whereby hydraulic fluid cannot flow between the hydraulic fluid reservoir 190 and the hydraulic cylinders 186. It should be readily apparent to those of skill in the art that in further embodiments of the crane return system 178 an auxiliary power source and an enable photoelectric sensor, as described above, may be used. Further, the crane return system may be adapted for use with any number of types of cranes for returning a crane to a home position.

The crane return system 178 facilitates retrieval of a disabled crane from areas that people cannot enter because of radioactive or hazardous material. In particular, when power is lost to the crane 10, the crane return system is able to operate and return the crane 10 to a home position because the crane return system does not rely upon electrical power. Instead, the crane return system uses potential energy converted to kinetic energy through the storage of pressurized hydraulic fluid.

The crane return systems 70, 178 discussed above are described for use when a loss of power occurs to the crane 10, such as when there is a power failure to the crane 10 or power is purposefully cut to the crane 10 (e.g., when mechanical failure occurs or a crane component breaks) so that the crane return system will automatically return the crane 10 to the home position. Once power is restored to the crane 10 (e.g., power is turned back on or necessary repairs are completed on the crane), the crane return system is reset and disabled, and the crane 10 will operate with its main components.

Various features and advantages of the invention are set forth in the following claims.

What is claimed is:

1. A control system for remotely operating an apparatus upon loss of main power, the control system comprising:
   an auxiliary power source to provide power to the apparatus;
   a first light-emitting source positioned remote of the apparatus;
   a first photoelectric sensor positioned proximate the apparatus and interconnected with the apparatus and the auxiliary power source, wherein the first photoelectric sensor selectively receives light from the first light-emitting source and the first photoelectric sensor enables power to flow from the auxiliary power source to the apparatus;
   a second light-emitting source positioned remote of the apparatus; and
   at least one second photoelectric sensor positioned proximate the apparatus and interconnected with a component of the apparatus and the auxiliary power source, wherein the second photoelectric sensor selectively receives light from the second light-emitting source and enables power to flow from the auxiliary power source to the respective component to activate movement of the component.

2. The control system of claim 1, and further comprising a plurality of second light-emitting sources wherein each second photoelectric sensor is activated by one second light-emitting source.

3. The control system of claim 1 wherein to activate the at least one photoelectric sensor, the first photoelectric sensor is activated.

4. The control system of claim 1 wherein the first and second light -emitting sources are lasers.

5. The control system of claim 1 wherein the at least one second photoelectric sensors are positioned adjacent the respective component for activating.

6. The control system of claim 1 wherein the photoelectric sensors are located on a panel positioned adjacent the apparatus.

7. The control system of claim 1 wherein the auxiliary power source comprises a plurality of solar cells.

8. The control system of claim 1 wherein each component of the apparatus is interconnected with two second photoelectric sensors, one second photoelectric sensor controlling movement of the component in a first direction and the other second photoelectric sensor controlling movement of the components in a second direction.

9. The control system of claim 1 wherein each second photoelectric sensor includes a light filter corresponding to one of a plurality of colors, wherein the second photoelectric sensor is activated when the light filter receives light having a same color.

10. A crane control system for remotely operating a crane upon loss of main power, the crane control system comprising:
   an auxiliary power source to provide power to the crane;
   a first light-emitting source positioned remote of the crane;
   a first photoelectric sensor positioned proximate the crane and interconnected with the crane and the auxiliary power source, wherein the first photoelectric sensor selectively receives light from the first light-emitting source and the first photoelectric sensor enables power to flow from the auxiliary power source to the crane;
   a second light-emitting source positioned remote of the crane; and
   at least one second photoelectric sensor positioned proximate the crane and interconnected with a component of the crane and the auxiliary power source, wherein upon a loss of power to the main power source, the second photoelectric sensor receives light from the second light-emitting source and enables power to flow from the auxiliary power source to the respective component to activate movement of the component.

11. The crane control system of claim 10, and further comprising a plurality of second light-emitting sources wherein each second photoelectric sensor is activated by one second light-emitting source.

12. The crane control system of claim 10 wherein to activate the at least one photoelectric sensor, the first photoelectric sensor is activated.

13. The crane control system of claim 10 wherein the first and second light-emitting sources are lasers.

14. The crane control system of claim 10 wherein the at least one second photoelectric sensors are positioned adjacent the respective component for activating.

15. The crane control system of claim 10 wherein the photoelectric sensors are located on a panel positioned adjacent the crane.

16. The crane control system of claim 10 wherein the auxiliary power source comprises a plurality of solar cells.

17. The crane control system of claim 10 wherein each component of the crane is interconnected with two second photoelectric sensors, one second photoelectric sensor controlling the movement of the component in a first direction and the other second photoelectric sensor controlling movement of the components in a second direction.

18. The crane control system of claim 10 wherein each second photoelectric sensor includes a light filter corresponding to one of a plurality of colors, wherein the second photoelectric sensor is activated when the light filter receives light having a same color.

19. A crane comprising:
   an auxiliary power source for providing power to the crane upon loss of main power
   a bridge adapted to travel along a pair of rails in a first direction and a second direction, the bridge including a truck with a plurality of wheels for travel along the pair of rails, the truck adapted for movement away from and towards the pair of rails;
   a hoist supported by the bridge and adapted for movement away from and toward a ground surface;
   an emergency control photoelectric sensor positioned proximate the crane and interconnected with the crane and the auxiliary power source, the emergency control photoelectric sensor adapted for receiving light from an emergency control light-emitting source positioned remote of the crane wherein the emergency control photoelectric sensor is selectively activated by the emergency control light -emitting source to enable power flow from the auxiliary power source to the crane;
   a bridge photoelectric sensor positioned proximate the crane and interconnected with the bridge wheels and the auxiliary power source, the bridge photoelectric sensor adapted for receiving light from a light-emitting source positioned remote of the crane wherein the bridge photoelectric sensor is selectively activated by the light-emitting source to move the bridge wheels;
   a bridge truck photoelectric sensor positioned proximate the crane and interconnected with the bridge truck and the auxiliary power source, the bridge truck photoelectric sensor adapted for receiving light from the light-emitting source wherein the bridge truck photoelectric sensor is selectively activated by the light-emitting source to move the bridge truck; and
   a hoist photoelectric sensor positioned proximate the crane and interconnected with the hoist and the auxiliary power source, the hoist photoelectric sensor adapted for receiving light from the light-emitting source wherein the hoist photoelectric sensor is selectively activated by the light-emitting source to move the hoist.

20. The crane of claim 19 wherein the emergency control photoelectric sensor is activated to activate the remaining photoelectric sensors.

21. The crane of claim 19, and further comprising:
   a trolley adapted to travel in a first direction and a second direction along at least one rail supported by the bridge, the trolley including a trolley truck with a plurality of wheels for travel on the at least one rail, the trolley truck adapted for movement away from and towards the at least one rail; and
   a trolley photoelectric sensor positioned proximate the crane and interconnected with the trolley wheels and the auxiliary power source, the trolley photoelectric sensor adapted for receiving light from the light-emitting source wherein the trolley photoelectric sensor is activated by the light-emitting source to move the trolley wheels.

22. The crane of claim 21, and further comprising a trolley truck photoelectric sensor positioned proximate the crane and interconnected with the trolley truck and the auxiliary power source, the trolley truck photoelectric sensor adapted for receiving light from the light-emitting source wherein the trolley truck photoelectric sensor is activated by the light-emitting source to move the trolley truck.

23. The crane of claim 19 wherein each photoelectric sensor includes a light filter corresponding to one of a plurality of colors, wherein each color corresponds to a particular movement of the respective component.

24. The crane of claim 19 wherein the bridge photoelectric sensor includes a first bridge photoelectric sensor and a second bridge photoelectric sensor, and further wherein the first bridge photoelectric sensor is activated to move the bridge wheels in the first direction and the second bridge photoelectric sensor is activated to move the bridge wheels in the second direction.

25. The crane of claim 19 wherein the bridge truck photoelectric sensor includes a first bridge truck photoelectric sensor and a second truck photoelectric sensor, and further wherein the first bridge truck photoelectric sensor is activated to move the bridge truck away from the pair of rails and the second bridge truck photoelectric sensor is activated to move the bridge truck towards the pair of rails.

26. The crane of claim 19 wherein the hoist photoelectric sensor includes a first hoist photoelectric sensor and a second hoist sensor, and further wherein the first hoist photoelectric sensor is activated to move the hoist away from the ground surface and the second hoist photoelectric sensor is activated to move the hoist towards the ground surface.

27. A method for returning a crane to a home base upon loss of main power the method comprising the steps of:
   charging an auxiliary power source;
   emitting light from a first light-emitting source positioned remote of the crane;
   activating an emergency control photoelectric sensor with light from the first light-emitting source wherein the emergency control photoelectric sensor is interconnected with the crane and the auxiliary power source;
   energizing the auxiliary power source by activation of the emergency control photoelectric sensor;
   emitting light from a second light-emitting source positioned remote of the crane;
   activating a photoelectric sensor with light from the second light-emitting source wherein the photoelectric sensor is interconnected with a crane component and the auxiliary power source; and
   activating the crane component by activation of the photoelectric sensor.

28. The method of claim 27, and further comprising the steps of:
   emitting light from a plurality of second light-emitting sources positioned remote of the crane; and
   activating a plurality of photoelectric sensors with light from the second light-emitting sources wherein each photoelectric sensor is activated by one second light-emitting source and each photoelectric sensor is interconnected with a crane component and the auxiliary power source.

* * * * *